(12) United States Patent
Sakamoto et al.

(10) Patent No.: US 7,218,228 B2
(45) Date of Patent: May 15, 2007

(54) ARTICLE MANAGEMENT APPARATUS AND INFORMATION PROCESSING METHODS

(75) Inventors: Kenji Sakamoto, Tokyo (JP); Goro Kunito, Tokyo (JP); Kenichi Yamazaki, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 246 days.

(21) Appl. No.: 10/932,039

(22) Filed: Sep. 2, 2004

(65) Prior Publication Data

US 2005/0093698 A1    May 5, 2005

(30) Foreign Application Priority Data

Sep. 5, 2003 (JP) .......................... P2003-314432
Nov. 17, 2003 (JP) .......................... P2003-387136

(51) Int. Cl.
*G08B 13/14* (2006.01)

(52) U.S. Cl. .................. 340/572.1; 340/572.7

(58) Field of Classification Search ............ 340/572.1, 340/572.4, 572.7, 5.92
See application file for complete search history.

(56) References Cited

U.S. PATENT DOCUMENTS

| 6,195,006 B1 | 2/2001 | Bowers et al. | |
| 6,259,367 B1 * | 7/2001 | Klein | 340/572.1 |
| 6,275,153 B1 | 8/2001 | Brooks | |
| 6,476,718 B1 * | 11/2002 | Cartwright et al. | 340/572.1 |
| 6,825,766 B2 * | 11/2004 | Hewitt et al. | 340/572.7 |
| 6,967,577 B2 * | 11/2005 | Taylor et al. | 340/572.1 |
| 6,982,644 B2 * | 1/2006 | McDaniel et al. | 340/572.1 |
| 7,012,529 B2 * | 3/2006 | Sajkowsky | 340/572.1 |
| 7,017,808 B2 * | 3/2006 | Holzer | 235/385 |
| 7,061,383 B2 * | 6/2006 | Davis et al. | 340/573.1 |
| 2002/0147650 A1 | 10/2002 | Kaufman et al. | |
| 2003/0117268 A1 | 6/2003 | Hewitt et al. | |

FOREIGN PATENT DOCUMENTS

| JP | 2001-22834 | 1/2001 |
| JP | 2002-163301 | 6/2002 |

* cited by examiner

*Primary Examiner*—John Tweel, Jr.
(74) *Attorney, Agent, or Firm*—Oblon, Spivak, McClelland, Maier & Neustadt, P.C.

(57) ABSTRACT

In a tag reader/writer 10 according to the present invention, first, a temporary ID receiver 11 receives a temporary ID unit of temporary IDs of RFID tags 41–44, and 47 detected by another tag reader/writer 20, and stores them into a temporary ID storage DB 12. When the tag reader/writer 10 detects RFID tags 41, 43, 45, 46, and 48 within a communication area of its own, a temporary ID acquirer 13 thereof acquires temporary IDs of those RFID tags and stores them into the temporary ID storage DB 12. Thereafter, the tag reader/writer 10 makes a temporary ID comparator 14 compare temporary ID units stored, to specify a temporary ID corresponding to a difference between them, based on the result of the comparison. When the temporary ID is a decrease, it is determined to be a lost article, and a message of the lost article is sent. When the temporary ID is an increase, it is determined to be a newly purchased article, and related advertisement information is provided.

12 Claims, 21 Drawing Sheets

*Fig.2*

| READER ID | TEMPORARY ID |
|---|---|
| 20 | Tom-41h |
| | Tom-42 |
| | Tom-43 |
| | Ann-44 |
| | Ann-47h |

Fig.3

| READER ID | TEMPORARY ID |
|---|---|
| 20 | Tom-41h |
| | Tom-42 |
| | Tom-43 |
| | Ann-44 |
| | Ann-47h |
| 10 | Tom-41h |
| | Tom-43 |
| | Bob-45 |
| | Bob-46 |
| | Bob-48h |

Fig.6

NEW TAG DETECTED
ENTER INFORMATION BELOW

ID:42

OWNER: ~51a
ATTACHED OBJECT: ~52a
SALES COMPANY: ~53a
YEAR, MONTH AND DAY OF PURCHASE: ~54a

SEND ~55a

NEW TAG DETECTED
ENTER INFORMATION BELOW

ID:42

OWNER: Ann ~51b

ATTACHED OBJECT: BAG ~52b

SALES COMPANY: Channel ~53b

YEAR, MONTH AND DAY OF PURCHASE: 2003/12/25 ~54b

SEND ~55b

| ID (31) | TEMPORARY ID (32) | ATTACHED OBJECT (33) | ATTRIBUTE INFORMATION (34) |
|---|---|---|---|
| 41 | Ann-41h | PERSON | NAME:Ann<br>BIRTH DATE:1959/1/1 |
| 42 | Ann-42 | BAG | SALES COMPANY:Channel<br>YEAR, MONTH AND DAY OF PURCHASE:2003/12/25 |
| 43 | Ann-43 | CELL PHONE | SALES COMPANY:○○○<br>YEAR, MONTH AND DAY OF PURCHASE:2001/12/25 |

| ID (31) | TEMPORARY ID (32) | ATTACHED OBJECT (33) | ATTRIBUTE INFORMATION (34) |
|---|---|---|---|
| 41 | | PERSON | NAME:Tom<br>BIRTH DATE:1959/1/1<br>OWNER:Tom |
| 42 | | BAG | SALES COMPANY:Channel<br>YEAR, MONTH AND DAY OF PURCHASE :2003/12/25<br>OWNER:Tom |
| 43 | | CELL PHONE | SALES COMPANY:OOO<br>YEAR, MONTH AND DAY OF PURCHASE :2001/12/25<br>OWNER:Tom |
| 44 | | CONFECTIONERY | SALES COMPANY:TSURUYA SENNENDO<br>YEAR, MONTH AND DAY OF PURCHASE :2001/12/25<br>OWNER:Ann |
| 47 | | PERSON | NAME:Ann<br>BIRTH DATE:1980/3/3<br>OWNER:Ann |

Fig.11

| ID | TEMPORARY ID | ATTACHED OBJECT | ATTRIBUTE INFORMATION |
|---|---|---|---|
| 41 | Tom-41h | PERSON | NAME:Tom<br>BIRTH DATE:1959/1/1<br>OWNER:Tom |
| 42 | Tom-42 | BAG | SALES COMPANY:Channel<br>YEAR, MONTH AND DAY OF PURCHASE:2003/12/25<br>OWNER:Tom |
| 43 | Tom-43 | CELL PHONE | SALES COMPANY:○○○<br>YEAR, MONTH AND DAY OF PURCHASE:2001/12/25<br>OWNER:Tom |
| 44 | Ann-44 | CONFECTIONERY | SALES COMPANY:TSURUYA SENNENDO<br>YEAR, MONTH AND DAY OF PURCHASE:2001/12/25<br>OWNER:Ann |
| 47 | Ann-47h | PERSON | NAME:Ann<br>BIRTH DATE:1980/3/3<br>OWNER:Ann |

Fig.13

| READER ID | ID OR TEMPORARY ID |
|---|---|
| 90 | Tom-41h |
|  | 42 |
|  | 43 |
|  | 45 |
|  | 46 |
|  | Bob-48h |

| READER ID | ID OR TEMPORARY ID |
|---|---|
| 70 | Tom-41h |
|  | 42 |
|  | 43 |
|  | 44 |
|  | Ann-47h |
| 80 | Tom-41h |
|  | 42 |
|  | 43 |

Fig.14

| READER ID | TEMPORARY ID |
|---|---|
| 20 | Tom-41h |
| | Tom-42 |
| | Tom-43 |
| | Ann-44 |
| | Ann-47h |
| 10 | Ann-44 |
| | Ann-47h |
| | Ann-49 |
| | Bob-45 |
| | Bob-46 |
| | Bob-48h |

Fig.16

| TAG READER/WRITER ID | RFID TAG ID UNIT | DATE AND TIME OF ACQUISITION |
|---|---|---|
| 211 | 241, 242, 243 | 2005/01/01 12:00 |
| 212 | 241, 243 | 2005/01/01 13:00 |

| RFID TAG ID (221 A) | NAME OF ARTICLE, OWNER (221 B) |
|---|---|
| 241 | HAT, Tom |
| 242 | WALLET, Tom |
| 243 | CELL PHONE, Tom |
| 244 | BAG, Tom |

| TAG READER/WRITER ID | RFID TAG ID UNIT | DATE AND TIME OF ACQUISITION |
|---|---|---|
| 211 | 241, 242, 243 | 2005/01/01 12:00 |
| 212 | 241, 242, 243, 244 | 2005/01/01 13:00 |

Fig.21

| RFID TAG ID | NAME OF ARTICLE |
|---|---|
| 241 | HAT (ARTICLE) |
| 242 | WALLET (ARTICLE) |
| 243 | CELL PHONE (ARTICLE) |
| 244 | BAG (ARTICLE) |
| 245 | Tom (PERSON) |

221A — RFID TAG ID column
221B — NAME OF ARTICLE column
221 — table

ARTICLE MANAGEMENT APPARATUS AND INFORMATION PROCESSING METHODS

BACKGROUND OF THE INVENTION

1. Field of the Invention

The present invention relates to article management apparatus and information processing methods.

2. Related Background Art

Methods of managing articles with RFID (Radio Frequency Identification) tags have been proposed heretofore. For example, Patent Document 1 discloses a method of letting a tag reader set at a bookshelf, simultaneously detect RFID tags attached to a book and to a user, thereby managing circulation of books. Patent Document 2 discloses a mobile equipment equipped with a tag reader as described below. Namely, the mobile equipment creates a list of necessary articles according to a user's schedule and, when the user leaves or drops an article in the list, it notifies the user of the fact.

[Patent Document 1] Japanese Patent Application Laid-Open No. 2001-22834

[Patent Document 2] Japanese Patent Application Laid-Open No. 2002-163301

SUMMARY OF THE INVENTION

However, the technology described in Patent Document 1 enables management of articles owned by the user at a certain specific point of time, but does not allow the user to grasp information about belongings varying with the lapse of time. The technology described in Patent Document 2 enables detection of temporal change of belongings on the basis of the list, but does not support a situation in which the user leaves or drops the mobile equipment itself. Furthermore, the technology described in Patent Document 2 has the disadvantage that it requires the creation and management of the list in the mobile equipment and articles not described in the list are excluded from objects of management.

An object of the present invention is, therefore, to manage articles on the basis of change of RFID tag IDs detected by a tag reader so that a user as an RFID tag owner can readily and accurately grasp information about belongings with RFID tags.

In order to achieve the above object, an article management apparatus according to the present invention comprises acquiring means for acquiring an RFID tag ID unit comprising an ID of an RFID tag attached to an article and enabling identification of an owner of the article; storing means for storing the RFID tag ID unit acquired by the acquiring means; specifying means for comparing the RFID tag ID unit corresponding to the owner, acquired by the acquiring means, with an RFID tag ID unit corresponding to the owner of an article corresponding to an RFID tag ID, acquired by the acquiring means, among RFID tag ID units stored by the storing means prior to the acquisition by the acquiring means, and for specifying an RFID tag ID corresponding to a difference obtained by the comparison; and transmitting means for transmitting information according to the RFID tag ID specified by the specifying means.

Here the RFID tag ID unit may consist of IDs of a plurality of RFID tags or an ID of one RFID tag.

In the article management apparatus according to the present invention, first, the acquiring means acquires an RFID tag ID unit comprising an ID of an RFID tag attached to an article and enabling identification of an owner of the article. The acquisition may be implemented, for example, by acquiring an ID read from an RFID tag by a tag reader installed in the city (normally, a plurality of tag readers installed therein), from the tag reader, or by letting the article management apparatus itself read an ID from an RFID tag. The apparatus may also be constructed to store information of a tag reader having read an ID, on the occasion of the storing means' storing the RFID tag ID, and to utilize the information.

Subsequently, the storing means stores the RFID tag ID unit acquired by the acquiring means. The RFID tag ID unit thus stored is an object to be compared with an ID unit of an RFID tag attached to an article of the same owner, acquired after the acquisition.

Then the acquiring means again acquires an RFID tag ID unit. After the acquisition, the specifying means compares an RFID tag ID unit corresponding to the owner of an article corresponding to an RFID tag ID, acquired by the acquisition, among RFID tag ID units stored by the storing means prior to the acquisition, with the RFID tag ID unit corresponding to the owner, acquired by the acquisition, and specifies an RFID tag ID corresponding to a difference obtained by the comparison.

Then the transmitting means transmits information according to the RFID tag ID specified by the specifying means.

According to the present invention, the article management apparatus manages articles on the basis of change of IDs of RFID tags acquired, so that the user as an RFID tag owner can readily and accurately grasp the information about belongings with RFID tags.

Another article management apparatus according to the present invention comprises an RFID tag ID database for storing an ID of an RFID tag and an owner of an article to which the RFID tag is attached, in correspondence with each other; acquiring means for acquiring an RFID tag ID unit; storing means for storing the RFID tag ID unit acquired by the acquiring means; specifying means for referring to the RFID tag ID database to specify an owner of an article corresponding to an RFID tag ID acquired by the acquiring means, for comparing the RFID tag ID unit corresponding to the specified owner, acquired by the acquiring means, with an RFID tag ID unit corresponding to the owner among RFID tag ID units stored by the storing means prior to the acquisition by the acquiring means, and for specifying an RFID tag ID corresponding to a difference obtained by the comparison; and transmitting means for transmitting information according to the RFID tag ID specified by the specifying means.

In the article management apparatus according to the present invention, first, the acquiring means acquires an RFID tag ID unit. Subsequently, the storing means stores the RFID tag ID unit acquired by the acquiring means.

Then the acquiring means again acquires an RFID tag ID unit. After the acquisition, the specifying means refers to the RFID tag ID database to specify an owner of an article corresponding to an RFID tag ID acquired by the acquisition, compares the RFID tag ID unit corresponding to the specified owner, acquired by the acquisition, with an RFID tag ID unit corresponding to the specified owner, among RFID tag ID units stored prior to the acquisition by the storing means, and specifies an RFID tag ID corresponding to a difference obtained by the comparison.

Then the transmitting means transmits information according to the RFID tag ID specified by the specifying means.

According to the present invention, the article management apparatus manages articles on the basis of change of IDs of RFID tags acquired, so that the user as an RFID tag owner can readily and accurately grasp the information about belongings with RFID tags.

Another article management apparatus according to the present invention comprises an RFID tag ID database for storing discrimination information for discrimination between a person with an RFID tag and an article with an RFID tag, in correspondence with an ID of each RFID tag; acquiring means for acquiring an RFID tag ID unit; storing means for storing the RFID tag ID unit acquired by the acquiring means; specifying means for referring to the RFID tag ID database to specify an ID of an RFID tag attached to a person, out of the RFID tag ID unit acquired by the acquiring means, for comparing the RFID tag ID unit acquired by the acquiring means, with an RFID tag ID unit acquired simultaneously with the ID of the RFID tag attached to the person, among RFID tag ID units stored by the storing means prior to the acquisition by the acquiring means, and for specifying an RFID tag ID corresponding to a difference obtained by the comparison; and transmitting means for transmitting information according to the RFID tag ID specified by the specifying means.

In the article management apparatus according to the present invention, first, the acquiring means acquires an RFID tag ID unit. Subsequently, the storing means stores the RFID tag ID unit acquired by the acquiring means.

Then the acquiring means again acquires an RFID tag ID unit. After the acquisition, the specifying means refers to the RFID tag ID database to specify an ID of an RFID tag attached to a person, out of the RFID tag ID unit acquired by the acquisition, compares the RFID tag ID unit acquired by the acquisition, with an RFID tag ID unit acquired simultaneously with the ID of the RFID tag attached to the person, among RFID tag ID units stored prior to the acquisition by the storing means, and specifies an RFID tag ID corresponding to a difference obtained by the comparison.

Then the transmitting means transmits information according to the RFID tag ID specified by the specifying means.

According to the present invention, articles with RFID tag IDs simultaneously acquired are assumed to be owned by an identical person, and the article management apparatus manages articles on the basis of change of IDs of RFID tags acquired, so that the user as an RFID tag owner can readily and accurately grasp the information about belongings with RFID tags.

The article management apparatus may also be constructed in a configuration wherein an RFID tag ID itself is configured to permit discrimination between a person with an RFID tag and an article with an RFID tag, instead of the RFID tag ID database storing the discrimination information for discrimination between a person with an RFID tag and an article with an RFID tag, in correspondence with an ID of each RFID tag.

Still another article management apparatus according to the present invention comprises acquiring means for acquiring an RFID tag ID unit; storing means for storing the RFID tag ID unit acquired by the acquiring means; comparing means for comparing the RFID tag ID unit acquired by the acquiring means, with an RFID tag ID unit stored by the storing means prior to the acquisition by the acquiring means; specifying means for, when a result of the comparison by the comparing means is that the two RFID tag ID units have identical IDs over a given number, comparing the RFID tag ID unit acquired by the acquiring means, with the RFID tag ID unit stored by the storing means, to specify an RFID tag ID corresponding to a difference obtained by the comparison; and transmitting means for transmitting information according to the RFID tag ID specified by the specifying means.

In the article management apparatus according to the present invention, first, the acquiring means acquires an RFID tag ID unit. Subsequently, the storing means stores the RFID tag ID unit acquired by the acquiring means.

Then the acquiring means again acquires an RFID tag ID unit. After the acquisition, if identical IDs over the given number exist in the RFID tag ID unit stored prior to the acquisition by the storing means and in the RFID tag ID unit acquired by the acquiring means, the RFID tag ID unit stored by the storing means is compared with the RFID tag ID unit acquired by the acquiring means to specify an RFID tag ID corresponding to a difference between them. Here the "given number" may be a constant number or a constant proportion preliminarily set. It is also possible to set different values according to conditions, e.g., different values at different sites.

Then the transmitting means transmits information according to the RFID tag ID specified by the specifying means.

According to the present invention, articles with RFID tag IDs simultaneously acquired are assumed to be owned by an identical person, and, if ID units of RFID tags attached to the fixed number of identical articles are read at different times, article units with those ID units are assumed to be owned by an identical person. The article management apparatus manages articles on the basis of change of IDs of RFID tags acquired, so that the user as an RFID tag owner can readily and accurately grasp the information about belongings with RFID tags.

Incidentally, the present invention can be described as the invention of the article management apparatus as described above, and can also be described as the invention of information processing methods as described below. This is the difference in category only, and they substantially arise from the same invention, with like operation and effect.

Namely, an information processing method according to the present invention is an information processing method in an article management apparatus comprising: an acquiring step of acquiring an RFID tag ID unit comprising an ID of an RFID tag attached to an article and enabling identification of an owner of the article; a storing step of storing the RFID tag ID unit acquired in the acquiring step; a specifying step of comparing the RFID tag ID unit corresponding to the owner, acquired in the acquiring step, with an RFID tag ID unit corresponding to the owner of an article corresponding to an RFID tag ID acquired in the acquiring step, among RFID tag ID units stored in the storing step prior to the acquisition in the acquiring step, and specifying an RFID tag ID corresponding to a difference obtained by the comparison; and a transmitting step of transmitting information according to the RFID tag ID specified in the specifying step.

Another information processing method according to the present invention is an information processing method in an article management apparatus comprising: an acquiring step of acquiring an RFID tag ID unit; a storing step of storing the RFID tag ID unit acquired in the acquiring step; a specifying step of referring to an RFID tag ID database storing an ID Of an RFID tag and an owner of an article to which the RFID tag is attached, in correspondence with each other, to specify an owner of an article corresponding to an RFID tag ID acquired in the acquiring step, comparing the RFID tag ID unit corresponding to the specified owner, acquired in the acquiring step, with an RFID tag ID unit corresponding to the owner among RFID tag ID units stored in the storing step prior to the acquisition in the acquiring step, and specifying an RFID tag ID corresponding to a difference obtained by the comparison; and a transmitting step of transmitting information according to the RFID tag ID specified in the specifying step.

Still another information processing method according to the present invention is an information processing method in an article management apparatus comprising: an acquiring step of acquiring an RFID tag ID unit; a storing step of storing the RFID tag ID unit acquired in the acquiring step; a specifying step of referring to an RFID tag ID database storing discrimination information for discrimination between a person with an RFID tag and an article with an RFID tag, in correspondence with an ID of each RFID tag, to specify an ID of an RFID tag attached to a person, out of the RFID tag ID unit acquired in the acquiring step, comparing the RFID tag ID unit acquired in the acquiring step, with an RFID tag ID unit acquired simultaneously with the ID of the RFID tag attached to the person, among RFID tag ID units stored in the storing step prior to the acquisition in the acquiring step, and specifying an RFID tag ID corresponding to a difference obtained by the comparison; and a transmitting step of transmitting information according to the RFID tag ID specified in the specifying step.

Still another information processing method according to the present invention is an information processing method in an article management apparatus comprising: an acquiring step of acquiring an RFID tag ID unit; a storing step of storing the RFID tag ID unit acquired in the acquiring step; a comparing step of comparing the RFID tag ID unit acquired in the acquiring step, with an RFID tag ID unit stored in the storing step prior to the acquisition in the acquiring step; a specifying step of, when a result of the comparison in the comparing step is that the two RFID tag ID units have identical IDs over a given number, comparing the RFID tag ID unit acquired in the acquiring step, with the RFID tag ID unit stored in the storing step, to specify an RFID tag ID corresponding to a difference obtained by the comparison; and a transmitting step of transmitting information according to the RFID tag ID specified in the specifying step.

In order to achieve the above object, an article management apparatus according to the present invention comprises storing means for storing an RFID tag ID unit comprising an ID of an RFID tag enabling identification of an owner, in advance; acquiring means for acquiring an RFID tag ID unit comprising an ID of an RFID tag enabling identification of an owner; specifying means for comparing the RFID tag ID unit stored in the storing means, with an RFID tag ID unit having an identical identified owner to that of the stored RFID tag ID unit and acquired by the acquiring means, and for specifying an RFID tag ID corresponding to a difference obtained by the comparison; and transmitting means for transmitting information according to the RFID tag ID specified by the specifying means.

An information processing method according to the present invention comprises a storing step of storing an RFID tag ID unit comprising an ID of an RFID tag enabling identification of an owner, in advance into storing means; an acquiring step of acquiring an RFID tag ID unit comprising an ID of an RFID tag enabling identification of an owner; a specifying step of comparing the RFID tag ID unit stored in the storing step with an RFID tag ID unit having an identical identified owner to that of the stored RFID tag ID unit and acquired in the acquiring step, and specifying an RFID tag ID corresponding to a difference obtained by the comparison; and a transmitting step of transmitting information according to the RFID tag ID specified in the specifying step.

Here the RFID tag ID unit may consist of IDs of a plurality of RFID tags or an ID of one RFID tag.

According to these aspects of the invention, the is article management apparatus manages articles on the basis of change of RFID tag IDs acquired, so that the user as an RFID tag owner can readily and accurately grasp the information about belongings with RFID tags.

In the article management apparatus according to the present invention, preferably, when the RFID tag ID specified by the specifying means is included in the RFID tag ID unit stored in advance in the storing means, the transmitting means transmits information indicating that an article identified by the specified RFID tag ID is a lost article.

When the specified RFID tag ID is included in the RFID tag ID unit stored in the storing means, i.e., when the specified RFID tag ID is an RFID tag ID corresponding to a decrease, it is presumed that the owner of the RFID tag left its own article identified by the RFID tag ID. According to the present invention, the owner is notified of the fact, so that the owner can readily and promptly grasp a drop of some or all of owned articles.

In the article management apparatus according to the present invention, preferably, when the RFID tag ID specified by the specifying means is not included in the RFID tag ID unit stored in advance in the storing means, the transmitting means transmits information about an article identified by the specified RFID tag ID.

When the specified RFID tag ID is not included in the RFID tag ID unit stored in the storing means, i.e., when the specified RFID tag ID is an RFID tag ID corresponding to an increase, it is presumed that the owner of the RFID tag newly acquired an article identified by the RFID tag ID. An RFID tag owner often tends to purchase or take over articles of great concern, and thus the information about the newly acquired article is highly likely to reflect tastes or preference of the RFID tag owner. According to the present invention, such article-related information is presented to the owner immediately after the acquisition, whereby the owner can readily and promptly get the self-advantageous information about the newly acquired article (e.g., information of advertisement or specification).

According to the present invention, articles are managed based on change of RFID tag IDs detected by a tag reader, whereby the user can readily and accurately grasp the information about belongings with RFID tags.

BRIEF DESCRIPTION OF THE DRAWINGS

FIG. 2 is a diagram showing a data storage example of a temporary ID storage DB before detection of temporary IDs by tag reader/writers in the first embodiment.

FIG. 3 is a diagram showing a data storage example of a temporary ID storage DB in a case where a decrease is detected between temporary IDs detected by tag reader/writers in the first embodiment.

FIG. 6 is a diagram showing an example of an attribute information input screen after detection of an RFID tag in the first embodiment.

FIG. 7 is a diagram showing an example of an attribute information input screen after input of attribute information in the first embodiment.

FIG. 8 is a diagram showing a data storage example inside a tag DB server in which temporary IDs are registered, in the first embodiment.

FIG. 9 is a diagram showing a data storage example of a tag DB server before assignment of temporary IDs, in the second technique of assignment of temporary IDs in the first embodiment.

FIG. 11 is a diagram showing a data storage example of the tag DB server updated after assignment of temporary IDs in the first embodiment.

FIG. 13 is a diagram showing a storage example of RFID tag IDs or temporary IDs in the reader management apparatus in the first embodiment.

FIG. 14 is a diagram showing a data storage example of a temporary ID storage DB in a case where an increase is detected between temporary IDs detected by the tag reader/writers in the first embodiment.

FIG. 16 is a diagram showing a data storage example of a storage DB in a case where a decrease is detected between tag IDs detected by tag readers in the second embodiment.

FIG. 17 is a diagram showing a data storage example of a tag DB in the second embodiment.

FIG. 19 is a diagram showing a data storage example of a storage DB in a case where an increase is detected between tag IDs detected by the tag readers in the second embodiment.

FIG. 21 is a diagram showing a data storage example of a tag DB in the second embodiment.

DESCRIPTION OF THE PREFERRED EMBODIMENTS

Each of the embodiments of the present invention will be described below with reference to the drawings. The first embodiment is directed to a scheme wherein tag readers are integrated with article management apparatus and wherein an ID of an RFID tag permits identification of an owner of an article to which the RFID tag is attached. The second embodiment is directed to a scheme wherein tag readers are separated from article management apparatus and wherein an owner of an article with an RFID tag is identified by referring to a tag database.

First Embodiment

Figure 1:
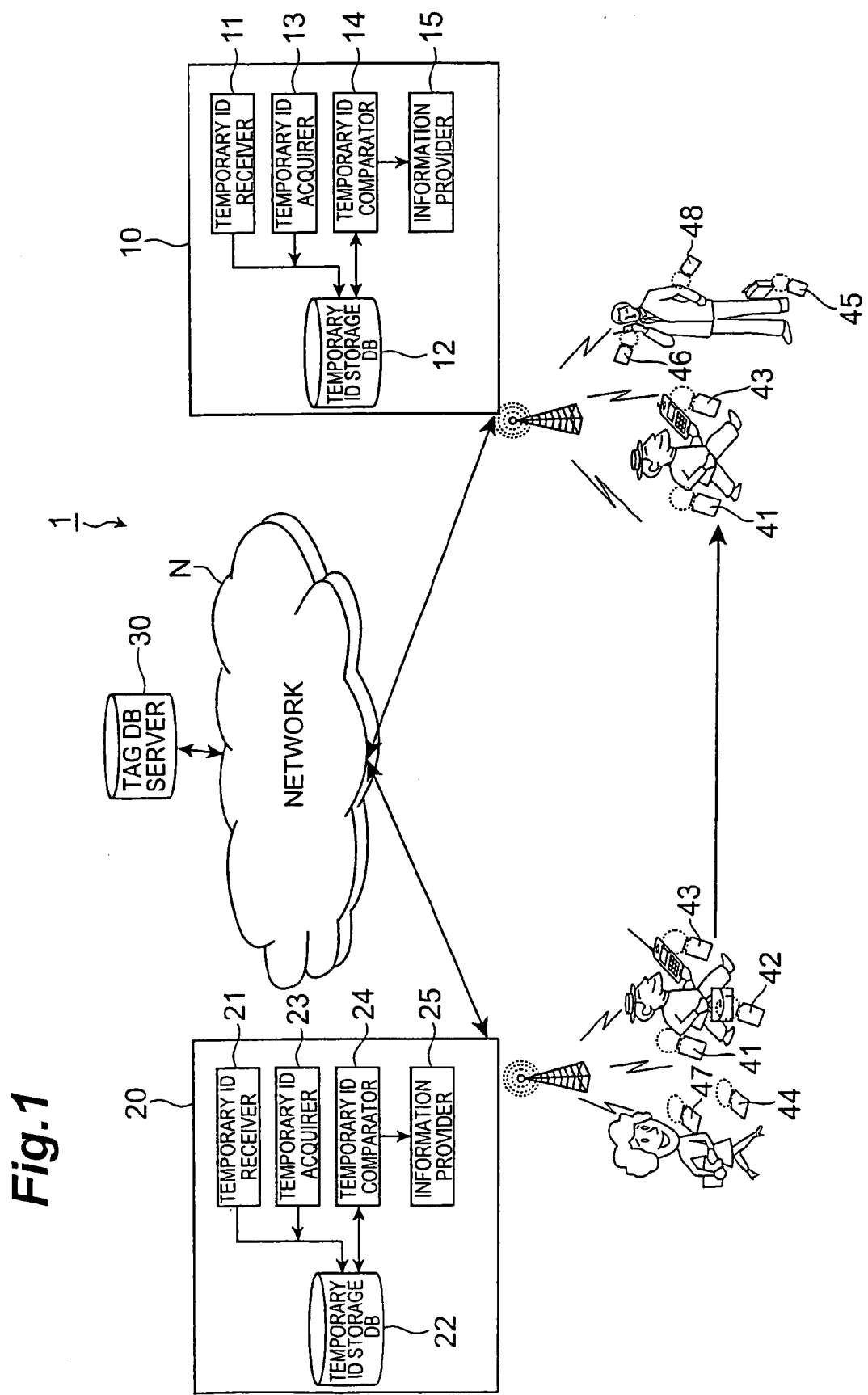
FIG. 1 is an illustration showing a configuration of an article management system according to the first embodiment of the present invention.

FIG. 1 shows a configuration of an article management system in the first embodiment. As shown in FIG. 1, the article management system 1 has tag reader/writers 10, 20 and a tag DB (DataBase) server 30. The tag reader/writer 10 and the tag reader/writer 20 are connected through a network N so as to be able to communicate with each other, and the tag DB server 30 is further connected to the network N.

The tag reader/writer 10 is functionally composed of a temporary ID receiver 11, a temporary ID storage DB 12 (corresponding to the storing means), a temporary ID acquirer 13 (corresponding to the acquiring means), a temporary ID comparator 14 (corresponding to the specifying means), and an information provider 15 (corresponding to the transmitting means).

The temporary ID receiver 11 receives a temporary ID unit acquired by the tag reader/writer 20, via the network N, and outputs it to the temporary ID storage DB 12. Here the temporary ID unit corresponds to the "RFID tag ID unit comprising an ID of an RFID tag enabling identification of an owner" in the scope of claims, and may consist of an ID or IDs.

In the temporary ID storage DB 12, the temporary ID unit received by the temporary ID receiver 11 is stored in correspondence with an ID of the tag reader/writer 20 which is the reception entity thereof. FIG. 2 shows a data storage example of the temporary ID storage DB 12 in which temporary ID units acquired by the tag reader/writer 20 are stored. As shown in FIG. 2, the temporary ID storage DB 12 has a reader ID area 121 and a temporary ID area 122.

In the reader ID area 121, "20" is stored as the identification information of the tag reader/writer 20 which received temporary IDs corresponding thereto. In the temporary ID area 122, temporary ID units acquired by the tag reader/writer 20 (e.g., "Tom-41$h$," "Tom-42," "Tom-43," "Ann-44," and "Ann-47$h$") are stored for individual owners of the corresponding RFID tags.

The temporary ID acquirer 13 acquires from each RFID tag existing in a communication area of the tag reader/writer 10, a temporary ID assigned to the RFID tag. After the temporary ID acquirer 13 acquires temporary IDs, the temporary ID storage DB 12 is updated into a state shown in FIG. 3. Namely, "Tom-41$h$," "Tom-43," "Bob-45," "Bob-46," and "Bob-48$h$," which are temporary ID units acquired by the tag reader/writer 10 itself, are stored in addition to the temporary ID units acquired by the tag reader/writer 20. These temporary ID units are also stored in correspondence with the identification information "10" of the tag reader/writer 10 which is the acquisition entity, and for individual owners of the corresponding RFID tags.

The temporary ID comparator 14 performs comparison between temporary ID units belonging to each RFID tag owner with reference to the data stored in the temporary ID storage DB 12. The detailed processing contents will be described later in the description of the operation, but, when the result of the comparison is that there is a difference between a temporary ID unit transmitted from the tag reader/writer 20 and a temporary ID unit acquired by the tag reader/writer 10, the temporary ID comparator 14 specifies a temporary ID (one or more IDs) corresponding to the difference. Then the temporary ID comparator 14 notifies the information provider 15 of the temporary ID thus specified, along with a flag indicating an increase or decrease of the temporary ID unit (hereinafter referred to as an "increase/decrease flag").

The information provider 15 acquires and transmits information to be provided for an RFID tag owner, based on the temporary ID and increase/decrease flag notified of by the temporary ID comparator 14. Namely, when the increase/decrease flag indicates a decrease, the information provider 15 acquires a name of an article identified by the temporary ID, from the tag DB server 30 and notifies the corresponding owner of it. On the other hand, when the increase/decrease flag indicates an increase, the information provider 15 acquires information about an article identified by the temporary ID, from an external server apparatus (not shown) and notifies the corresponding owner of it.

The tag reader/writer 20 is installed so that its detection area is adjacent to that of the tag reader/writer 10. Since the tag reader/writer 20 has a functional configuration similar to that of the tag reader/writer 10, its corresponding components are denoted by the same series of numbers (having the same last digits), without description thereof.

The tag DB server 30 stores RFID tag IDs (temporary IDs) provided with identification information of owners of RFID tags, for individual owners.

The operation will be described below.

Figure 4:
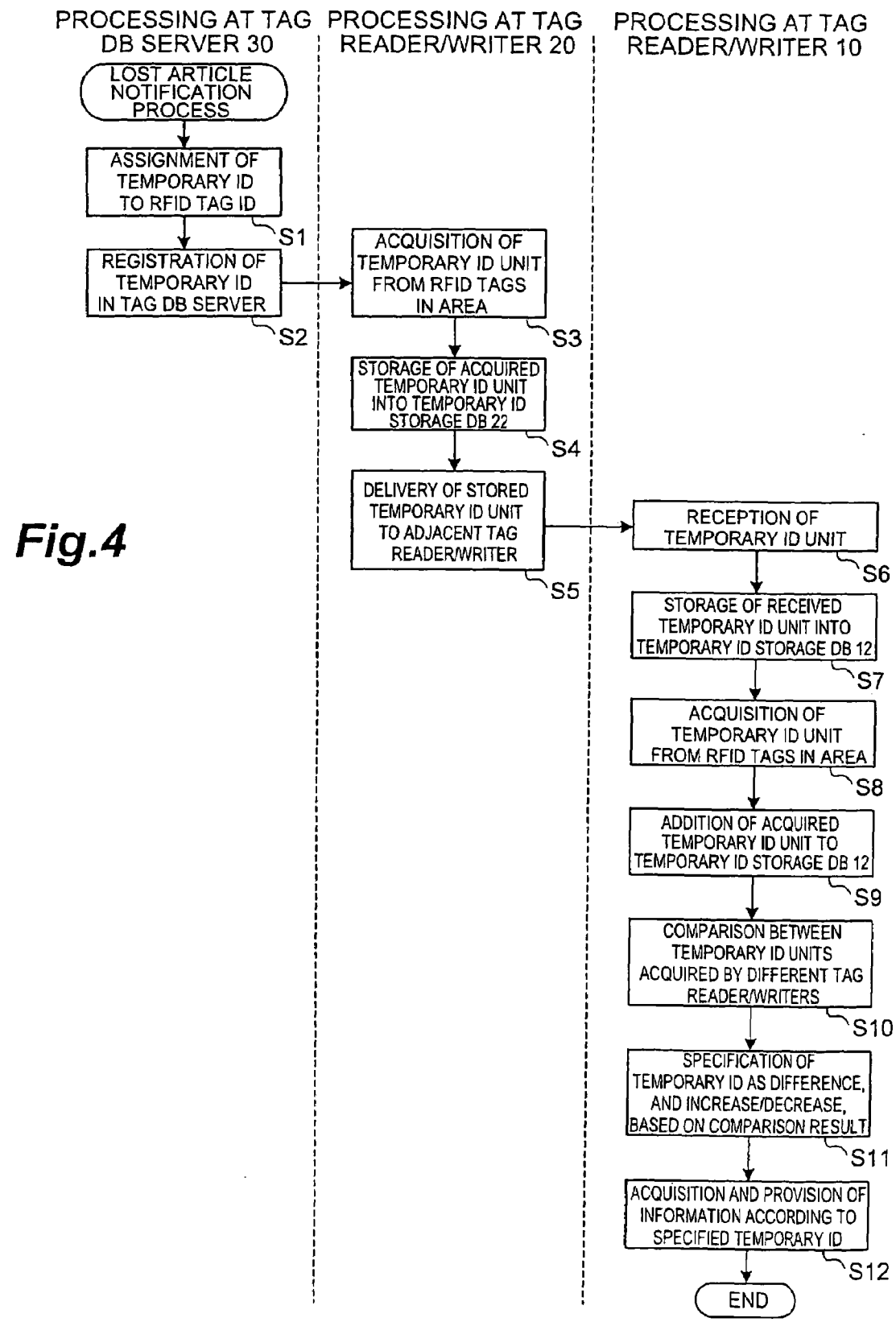
FIG. 4 is a flowchart for illustrating a lost article notification process executed by the article management system in the first embodiment.

First described is a temporary ID assignment process (S1 in FIG. 4) to the tag DB server 30, which is carried out as a premise for a lost property notifying process. A variety of techniques can be contemplated for the assignment of temporary IDs to IDs of RFID tags (grouping). The techniques will be exemplified below.

Figure 5:
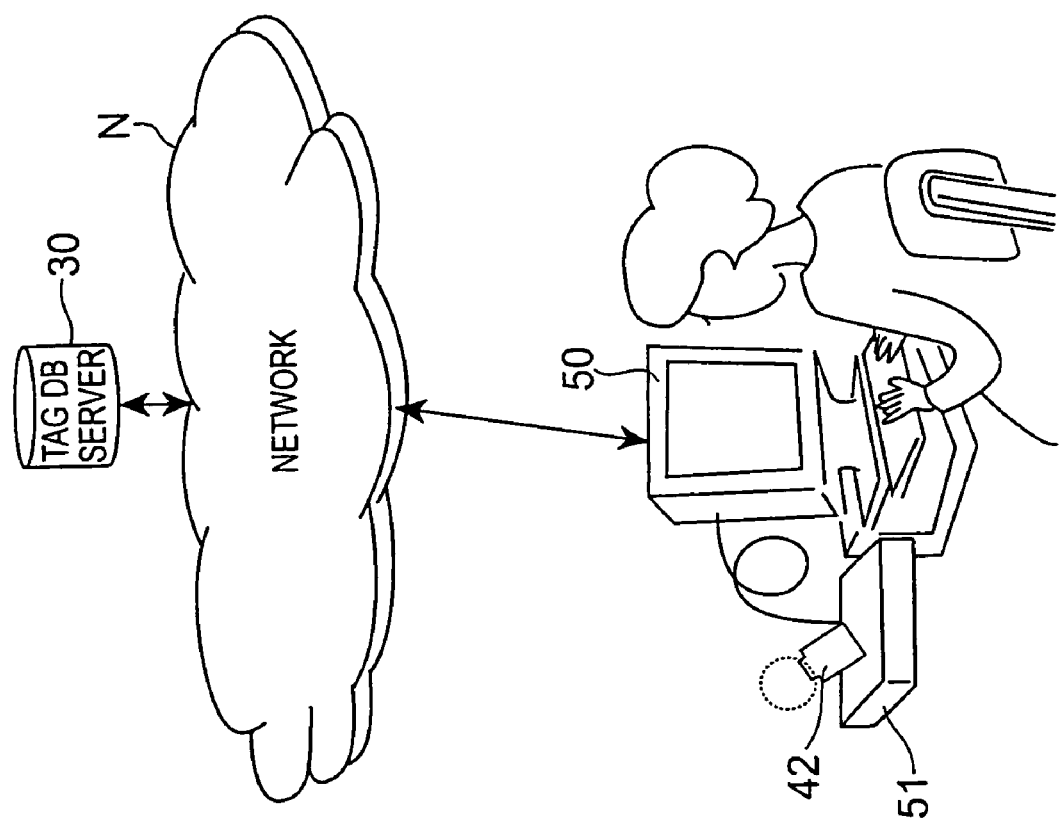
FIG. 5 is an illustration showing a situation in which a user registers attribute information of an RFID tag, in the first technique of assignment of temporary ID in the first embodiment.

The first technique is a technique for a user as an owner of an RFID tag personally to make a tag reader/writer read a tag ID to be registered. Namely, as shown in FIG. 5, when the user gets a new RFID tag 42, the user makes a tag reader/writer 51 of user's PC (Personal Computer) 50 read an RFID tag ID of the tag. The RFID tag ID is transmitted via PC 50 to the tag DB server 30, and the RFID tag ID has not been registered in the tag DB server 30 yet. Therefore, an input screen 50*a* shown in FIG. 6 is displayed on a display of the PC 50.

As shown in FIG. 6, the input screen 50*a* displays an ID "42" existing in the RFID tag, and items 51*a*, 52*a*, 53*a*, and 54*a* for input of attribute information of an article to which the RFID tag is to be attached. Entries that can be entered into these items are information indicating an owner of the article, an attached object, (a name of the article), a sales company, and year, month and day of purchase. FIG. 7 shows an input screen 50*b* as an example of a state in which the user has entered desired data in each of the above items. Through this input process, it becomes feasible to specify the owner of the RFID tag with ID "42," as "Ann" The tag reader/writer 51 was described as one held by the PC, but it is a matter of course that it can be one held by a portable terminal such as a cell phone or a PDA (Personal Digital Assistant).

FIG. 8 shows a data storage example inside the tag DB server 30 according to the first technique. As shown in FIG. 8, the tag DB server 30 stores RFID tag IDs without owner identification information, owner-identifiable temporary IDs, attached objects, and attribute information of the attached objects in correspondence with each other. For example, since the RFID tag with ID "42" registered by the user "Ann" is attached to a bag, the owner of this bag can be identified by reference to the temporary ID "Ann-42." An identifier h at an end of the temporary ID "Ann-41*h*" indicates that the corresponding RFID tag with ID "41" is one for identification of the owner herself (person).

Figure 10:
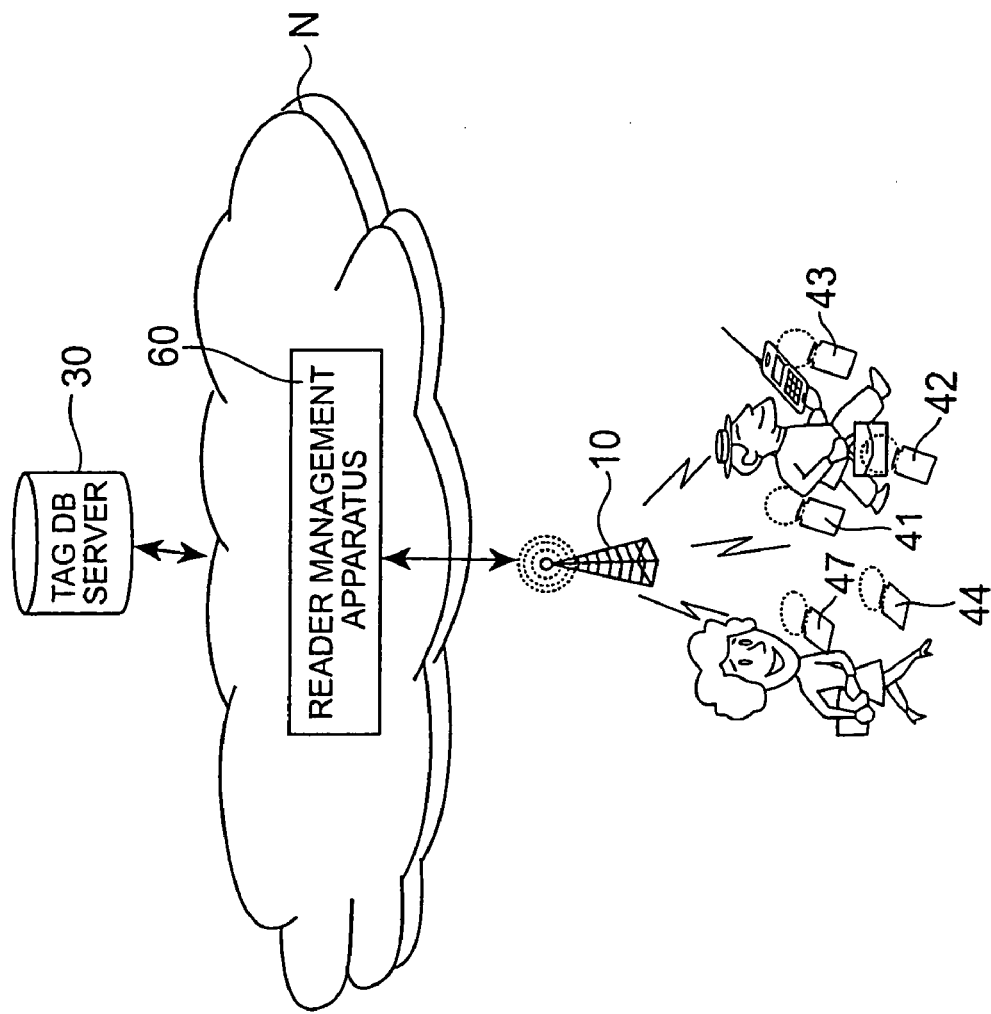
FIG. 10 is an illustration showing a situation in which RFID tag IDs detected are transferred to a reader management apparatus, in the first embodiment.

The second technique is a technique in which a system administrator preliminarily registers IDs of all attached objects including people, and the attribute information including owners, in the tag DB server 30. Namely, before the assignment of temporary IDs, as shown in FIG. 9, RFID tag IDs without owner identification information, attached objects, and attribute information of the attached objects are stored in correspondence with each other. As shown in FIG. 10, the tag reader/writer 10 transfers IDs of RFID tags 41–44, and 47 detected during a predetermined period of time (e.g., about two seconds), to a reader management apparatus 60 on the network N.

The reader management apparatus 60 refers to the registered contents in the tag DB server 30 to specify owners of these RFID tags. When RFID tags belong to an identical owner, the reader management apparatus 60 adds information enabling identification of the owner. The information enabling identification of the owner is, for example, "Tom" or "Ann" representing a name of the owner. As a result, the temporary IDs turn out to be "Tom-41*h*" and "Ann-47*h*" for identification of people, and "Tom-42," "Tom-43," and "Ann-44" for identification of articles owned by people. When the reader management apparatus 60 notifies the tag DB server 30 of these temporary IDs thus assigned, the tag DB server 30 is updated into a state shown in FIG. 11.

Figure 12:
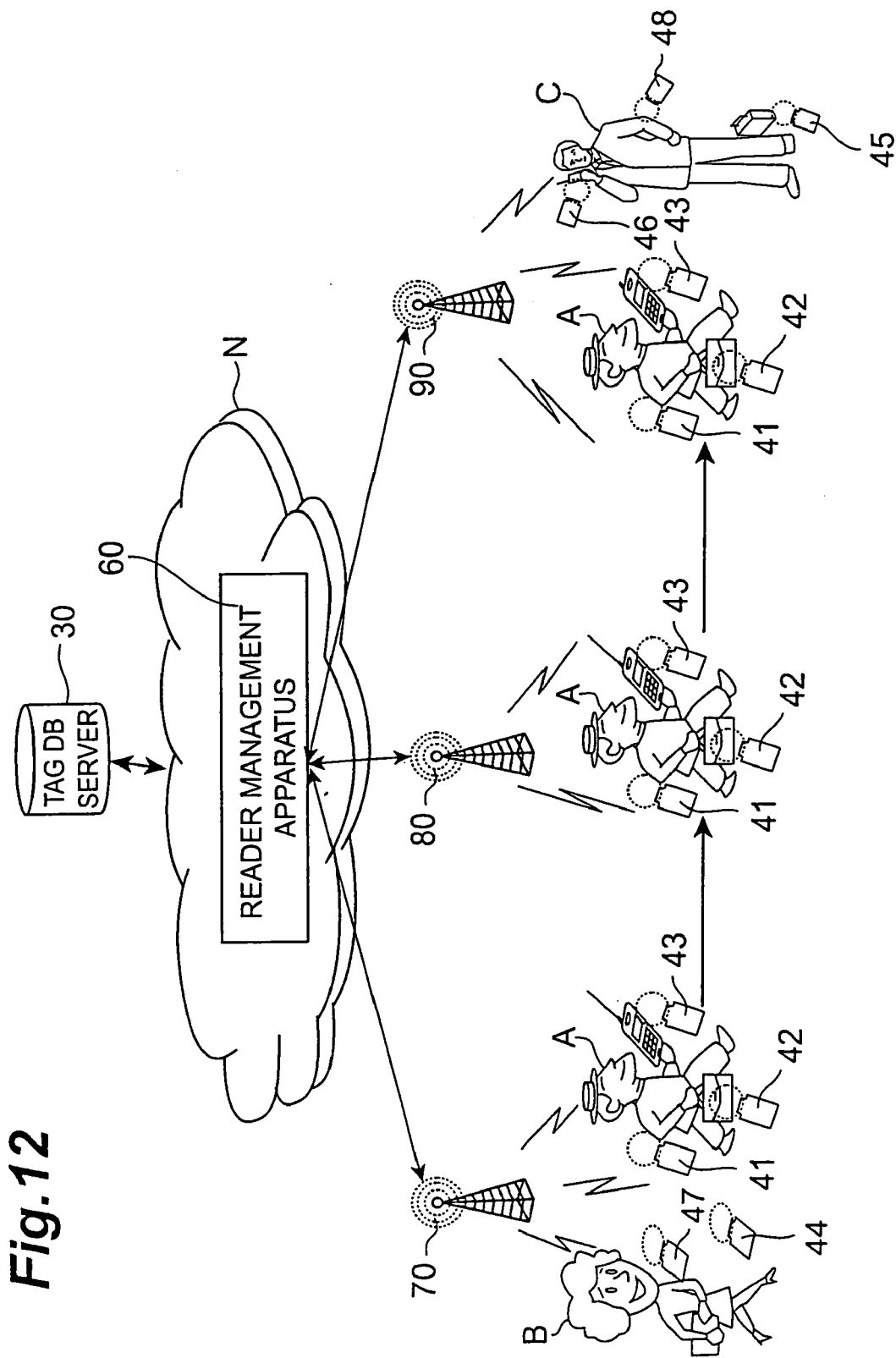
FIG. 12 is an illustration showing a situation in which detected RFID tag IDs or temporary IDs are transferred to the reader management apparatus, in the third technique of assignment of temporary IDs in the first embodiment.

The third assignment technique is a technique of determining temporary IDs, based on a history of RFID tag IDs acquired by a plurality of tag reader/writers. In this technique, a temporary ID is preliminarily recorded in only an RFID tag whose attached object is a person. This temporary ID contains identification information of an owner, an RFID tag ID, and an identifier indicating that its attached object is a person, for example, like "Tom-41*h*." In FIG. 12 a temporary ID of a person "Tom-41*h*" is recorded in an RFID tag 41 and, similarly, "Ann-47*h*" in an RFID tag 47. Furthermore, "Bob-48*h*" is recorded in an RFID tag 48.

First, a tag reader/writer 70 detects RFID tags 41–44, and 47, whereupon it transmits IDs of these tags (temporary IDs as to the RFID tags 41, 47) with an ID of the tag reader/writer 70 to the reader management apparatus 60. This transmission process is carried out for IDs of RFID tags detected within a predetermined period of time (e.g., about two seconds).

With movement of the owner A of RFID tag 41, a tag reader/writer 80 comes to detect the RFID tags 41–43, whereupon it transmits IDs of these tags (the temporary ID as to the RFID tag 41) with an ID of the tag reader/writer 80 to the reader management apparatus 60. With further movement of the owner A, a tag reader/writer 90 comes to detect the RFID tags 41–43, 45, 46, and 48, whereupon it transmits IDs of these tags (the temporary IDs as to the RFID tags 41 and 48) with an ID of the tag reader/writer 90 to the reader management apparatus 60.

As a result, the information as shown in FIG. 13 is stored in the reader management apparatus 60. The reader management apparatus 60 determines that a common ID among the IDs or temporary IDs acquired by the different tag reader/writers 70, 80, and 90 belongs to an identical owner, and assigns a temporary ID thereto. With reference to FIG. 13, a temporary ID acquired by all the three tag reader/writers is "Tom-41*h*," and IDs acquired thereby are "42" and "43." Therefore, the reader management apparatus 60 determines that the RFID tags with the IDs of "42" and "43" are associated with belongings of the owner A having "Tom-41*h*." Then "Tom-42" is assigned as a temporary ID of "42," and "Tom-43" as a temporary ID of "43." These temporary IDs are registered in the tag DB server 30.

The temporary IDs assigned by any one of the above techniques may be recorded in the RFID tags, or only IDs may be recorded in the RFID tags. If the temporary IDs are not recorded in the RFID tags, the tag reader/writers 10, 20 can specify the temporary IDs by referring to the tag DB server 30, using the IDs acquired from the RFID tags, as keys, as occasion demands. Subsequent processes (processes at and after S2 in FIG. 4) in the lost property notifying process will be described below based on the former scheme.

After all the temporary IDs are registered in correspondence with their attribute information in the tag DB server 30 (S2), processing on the tag reader/writer side starts. First, the tag reader/writer 20 acquires from RFID tags 41, 42, 43, 44, and 47 located in its communication area, their temporary IDs (temporary ID unit) by the temporary ID acquirer 23 (S3). Subsequently, the temporary ID acquirer 23 stores the temporary ID unit acquired at S3, into the temporary ID storage DB 22 (S4). The temporary ID acquirer 23 also delivers the stored temporary ID unit via the network N to tag reader/writers adjacent to the tag reader/writer 20 (S5).

The present embodiment illustrates and explains a scheme in which the temporary ID unit is transmitted to only the tag reader/writer 10 adjacent to the tag reader/writer 20, for simplicity. However, since the moving direction of the RFID tag owner is unknown to the tag reader/writer 20 in practice, the temporary ID unit is transmitted to all the tag reader/writers (including those not shown) adjacent to the tag reader/writer 20.

At S6, the tag reader/writer 10 receives the temporary ID unit transmitted from the tag reader/writer 20. The temporary ID unit thus received is outputted to the temporary ID storage DB 12 to be stored therein (S7). When the tag reader/writer 10 acquires from the RFID tags 41, 43, 45, 46, and 48 belonging to the interior of its communication area, the temporary IDs thereof (S8), the temporary ID unit thus acquired is additionally recorded into the temporary ID storage DB 12 (S9). As a result, the data configuration in the temporary ID storage DB 12 turns into the state shown in FIG. 3.

At S10, the tag reader/writer 10 makes the temporary ID comparator 14 start a comparison process of temporary ID units. This comparison process is initiated as triggered by an event in which two adjacent tag reader/writers acquired an identical, temporary ID accompanied by the identifier h indicating a person. This comparison process is executed for temporary ID units of belongings of a person having the identical, temporary ID. In the present embodiment, among the temporary IDs acquired by either of the tag reader/writers 10, 20, the temporary IDs each indicating a person are the three IDs of "Tom-41h," "Ann-47h," and "Bob-48h" (cf. FIG. 3). However, the both tag reader/writers 10, 20 acquired only "Tom-41h." Therefore, a comparison is made between temporary ID units of RFID tags owned by "Tom."

The tag reader/writer-10 makes the temporary ID comparator 14 specify a temporary ID (or a temporary ID unit) corresponding to a difference between the temporary ID units from the different acquisition sources, based on the comparison result at S10. At the same time, the temporary ID comparator 14 also determines whether the temporary ID is a decrease or an increase (S11). A result of the determination is reflected in the aforementioned increase/decrease flag.

In the present embodiment, a temporary ID unit of belongings acquired about the owner "Tom" by the tag reader/writer 20 consists of "Tom-42" and "Tom-43," and a temporary ID unit of belongings acquired immediately thereafter by the tag reader/writer 10 consists of "Tom-43," indicating a decrease of "Tom-42." Therefore, the temporary ID comparator 14 outputs the specified temporary ID with the increase/decrease flag "0" indicating the decrease, to the information provider 15.

At S12, the information provider 15 notifies the owner of a message of a lost article, and the lost article (a name of an article and an attached object), based on the information supplied from the temporary ID comparator 14. The information provider 15 acquires the name of the article by referring to the tag DB server 30, using the specified temporary ID "Tom-42" as a key. With reference to FIG. 11, the article with the RFID tag assigned the temporary ID "Tom-42" is a bag. Therefore, the message notified of herein is, for example, "You seem to have dropped a bag."

This notification can be done through a mobile equipment carried by the owner, or, in view of cases where the owner drops or leaves the mobile equipment itself, the notification may be made by making use of an information presenting means such as a screen installed in the vicinity of the tag reader/writer 10. This permits the owner of the lost article to instantly notice the drop of the bag during the movement between the tag reader/writer 20 and the tag reader/writer 10, from the contents of the notification.

The mobile equipment is, for example, a cell phone or a PDA, but is not limited to these and may be information equipment such as a personal computer with a communication function.

If the temporary ID storage DB 12 to which the temporary ID unit was added at S9 turns into a state shown in FIG. 14, a process described below will be carried out. In FIG. 14, a temporary ID unit of belongings acquired about the owner "Ann" by the tag reader/writer 20 consists of "Ann-44," and a temporary ID unit of belongings acquired thereafter by the tag reader/writer 10 consists of "Ann-44" and "Ann-49." Namely, "Ann-49" is an increase. Therefore, the temporary ID comparator 14 outputs the specified temporary ID with the increase/decrease flag "1" indicating an increase, to the information provider 15.

The information provider 15 detects purchase of the new article from the information supplied from the temporary ID comparator 14, and notifies an external information providing server apparatus (not shown) of a name of the purchase. When the article provided with the RFID tag assigned the temporary ID "Ann-49" is clothes, a name of the clothes is notified of.

Receiving this notification, the server apparatus presents advertisement information about accessories and bags looking nice with the clothes, via the tag reader/writer 10 to the owner. This presentation process can also be performed by use of the mobile equipment carried by the owner or by the information presenting means installed in the vicinity of the tag reader/writer 10. This permits an information providing party to provide timely information of high interest for the purchaser of the article.

In the article management system 1, as described above, the tag reader/writer 10 provides useful information for the owner of RFID tags, based on the comparison result between the temporary IDs of RFID tags detected by its own and the temporary IDs of RFID tags detected by another tag reader/writer 20. There are no specific restrictions on the contents and use of such information; for example, it is information for notifying the owner of a lost article, or information about a purchase of the owner. This permits the user as an owner of RFID tags to acknowledge whether an article is lost (what is lost in a case of a lost article), information about commodities of interest, etc. in real time, without need for any active operation by the user.

The scheme described in the present embodiment is just a preferred example of the article management system according to the present invention, and it is noted that the present invention is not limited to the above scheme. For example, the information based on the comparison result between temporary ID units does not always have to be provided for the user, but it may be a control signal transmitted to information processing equipment. More specifically, by the transmission of the control signal, it becomes feasible to implement a scheme in which tag reader/writers are installed at a certain location in a certain facility and in the vicinity of an exit and in which opening/closing operation of an automatic door (information processing equipment) at the exit is stopped if there is a difference, either an increase or a decrease, between temporary ID units detected thereby. This prevents the user from leaving the facility without noticing the notification of the lost article, or prevents a commodity with an RFID tag from being carried out of a store without passage through a purchase process.

In the present embodiment the sequential processes of transmission, storage, and comparison of temporary ID units were executed by the tag reader/writers 10, 20 themselves, but the sequential processes may be executed by another device provided on the network N, while the tag reader/writers 10, 20 transmit the temporary ID units acquired, onto the network N.

Second Embodiment

Figure 15:
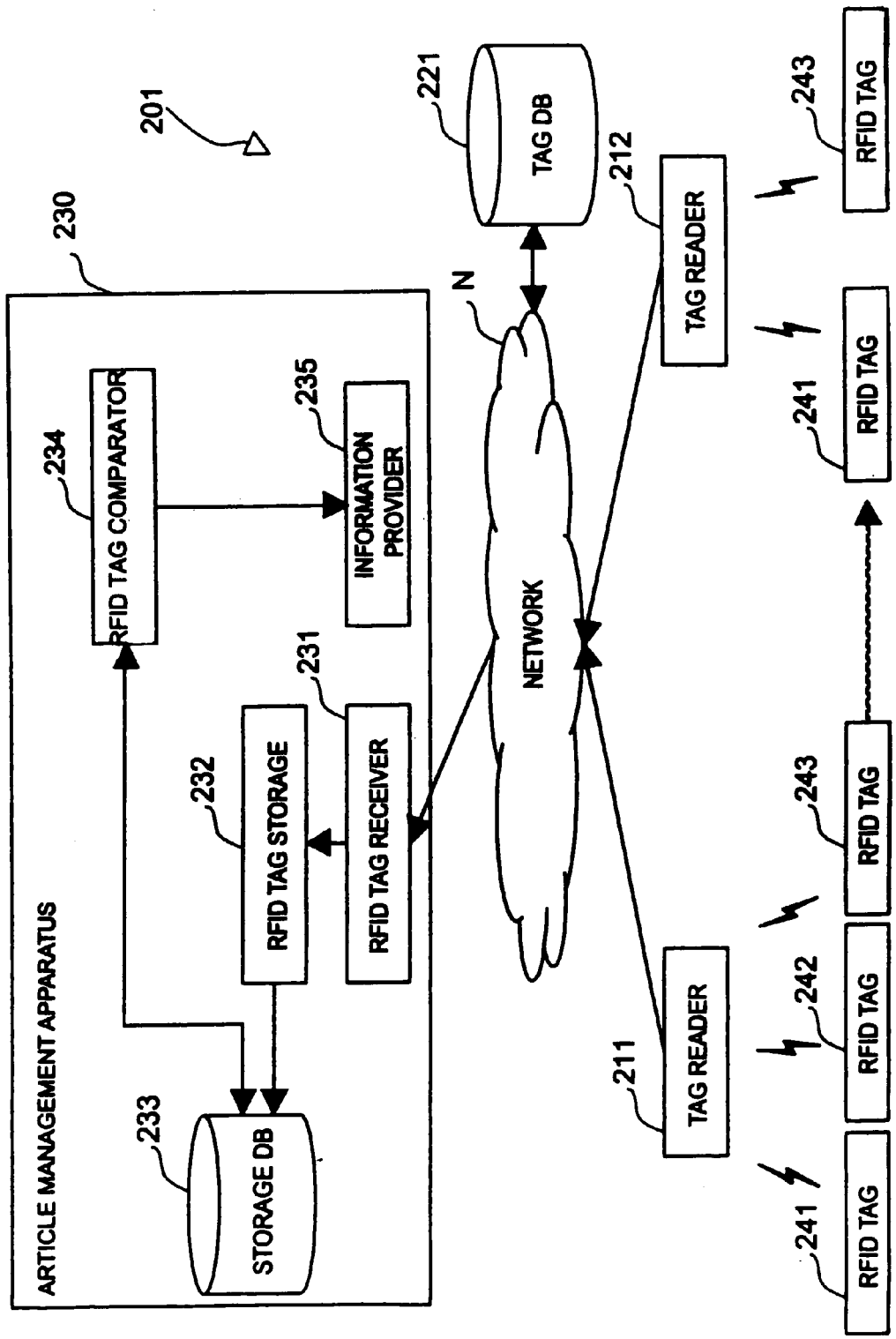
FIG. 15 is an illustration showing a configuration of an article management system according to the second embodiment of the present invention.

FIG. 15 shows a configuration of an article management system in the second embodiment. As shown in the same figure, the article management system 201 has tag readers 211, 212, a tag DB 221, and an article management apparatus 230. The tag reader 211 and tag reader 212 are connected through a network N to the article management apparatus 230 and the tag DB 221 is further connected to the network N. RFID tags 241–243 are attached to respective articles and have respective IDs to uniquely identify the corresponding tags, and the IDs are read by the tag readers 211, 212.

Each of the tag readers 211, 212 acquires a tag ID from each RFID tag located in a detection area of the tag reader. A group of IDs acquired from RFID tags simultaneously detected within a short period of time (about two seconds) by the same tag reader is referred to as an RFID tag ID unit detected simultaneously.

The article management apparatus 230 is functionally composed of an RFID tag receiver 231 (corresponding to the acquiring means), an RFID tag storage 232 (corresponding to the storing means), a storage DB 233, an RFID tag comparator 234 (corresponding to the specifying means), and an information provider 235 (corresponding to the transmitting means).

The RFID tag receiver 231 receives RFID tag ID units acquired by the tag readers 211 and 212, via the network N and outputs them to the RFID tag storage 232. Each ID unit herein may consist of IDs of a plurality of RFID tags or an ID of one RFID tag.

The RFID tag storage 232 outputs the RFID tag ID units received by the RFID tag receiver 231, to the storage DB 233.

In the storage DB 233 the RFID tag ID units outputted by the RFID tag storage 232 are stored in correspondence with IDs of the tag readers 211 and 212 having detected the RFID tag units and with dates and times of acquisition of the RFID tag ID units. FIG. 16 shows a data storage example of the storage DB 233 storing the RFID tag ID units acquired by the tag readers 211 and 212. As shown in the same figure, the storage DB 233 has a reader ID area 233A, an RFID tag ID area 233B, and an acquisition date and time area 233C. The reader ID area 233A stores ID "211" corresponding to the tag reader 211 and ID "212" corresponding to the tag reader 212, as identification information of the tag readers having received the RFID tag IDs. The RFID tag ID area 233B stores the RFID tag ID unit ("241," "242," and "243") acquired by the tag reader 211 and the RFID tag ID unit ("241" and "243") acquired by the tag reader 212. The acquisition date and time area 233C stores the dates and times of acquisition of the RFID tag ID units ("2005/01/01 12:00" and "2005/01/01 13:00").

The RFID tag comparator 234 refers to the data stored in the storage DB 233 to perform a comparison between the RFID tag ID units. The detailed processing contents will be described later, but, when the result of the comparison is that there is a difference between the RFID tag ID unit acquired by the tag reader 211 and the RFID tag ID unit acquired by the tag reader 212, the RFID tag comparator 234 specifies an RFID tag ID (either one or more IDs) corresponding to the difference. The RFID tag comparator 234 notifies the information provider 235 of the specified RFID tag ID with a flag indicating an increase or a decrease of the RFID tag (hereinafter referred to as an "increase/decrease flag").

The information provider 235 acquires information to be provided for an owner of an article to which the RFID tag is attached, based on the RFID tag ID and the increase/decrease flag notified of by the RFID tag comparator 234, and transmits the information. Namely, when the increase/decrease flag indicates a decrease, the information provider 235 notifies the owner of the article, of a name of the article identified by the RFID tag ID. On the other hand, when the increase/decrease flag indicates an increase, the information provider 235 acquires information about the article identified by the RFID tag ID, from an external server apparatus (not shown), and provides the information for the owner of the article.

The tag readers 211 and 212 are installed so that the detection areas of the respective tag readers are adjacent to each other, and, where the RFID tags 241–243 are located in the detection area of the tag readers 211, 212, they acquire IDs of the RFID tags 241–243.

The tag DB 221 stores RFID tag IDs in correspondence with names of articles to which the RFID tags are attached, and with information of owners of the articles. FIG. 17 shows a data storage example of the tag DB 221. As shown in the same figure, the tag DB 221 has an RFID tag ID area 221A and an article name and owner area 221B. The RFID tag ID area 221A stores IDs of RFID tags, and the article name and owner area 221B stores names of articles with the RFID tags and information of owners of the articles (e.g., "hat, Tom"). The article name and owner information may be registered in the tag DB 221 by the purchaser when the owner purchases the article, or may be registered in such a manner that a company having manufactured the article preliminarily registers only the name of the article and that the purchaser registers only the owner information at the time of purchase of the article. In the present embodiment the tag DB 221 is connected through the network N to the article management apparatus 230, but it may be integrated with the article management apparatus 230.

Figure 18:
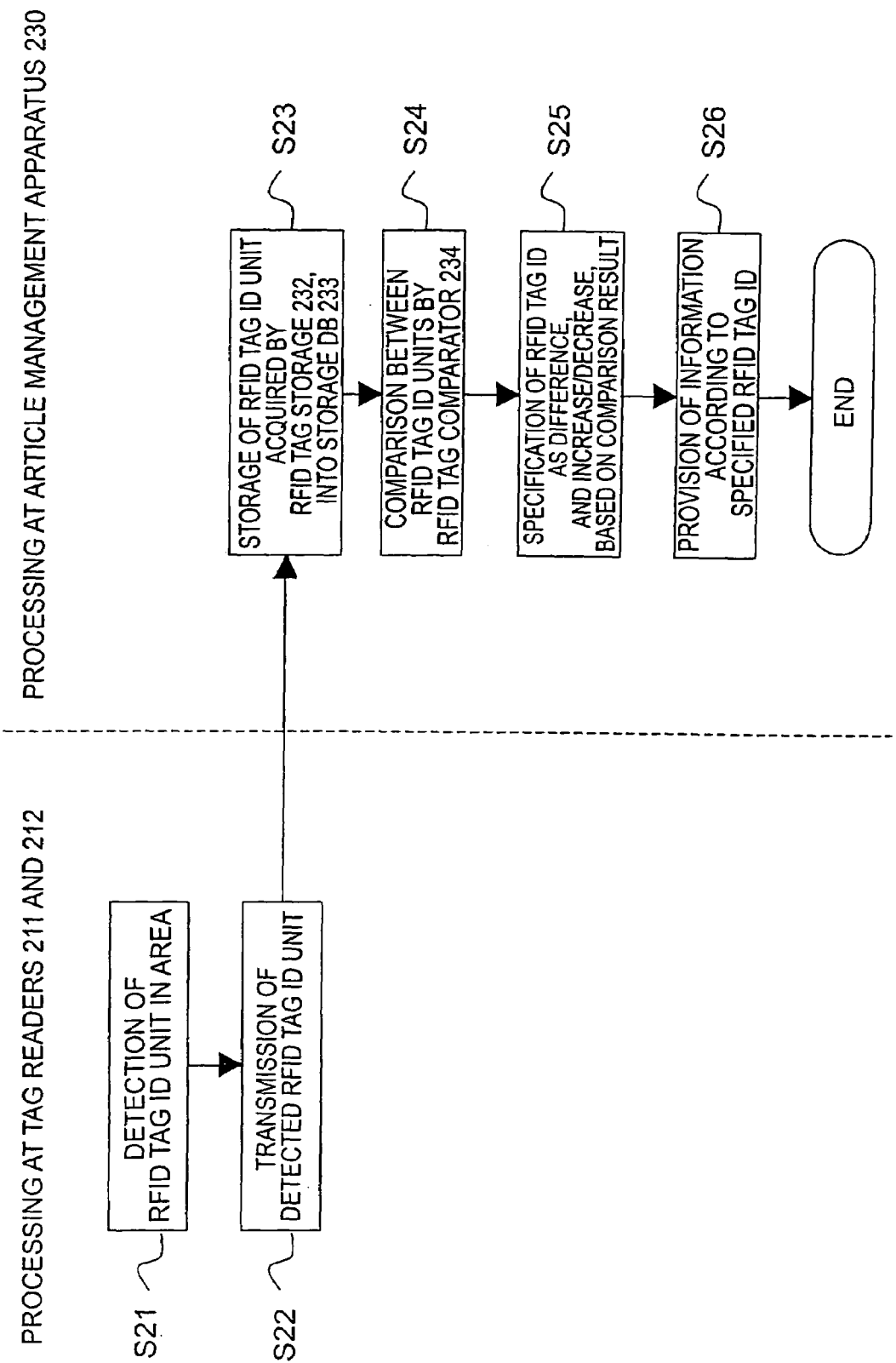
FIG. 18 is a flowchart for illustrating a lost article notification process executed by the article management system in the second embodiment.

The processing executed by the article management system in the present embodiment will be described below. First, a lost article notification service will be described with reference to FIG. 18.

The tag reader 211 acquires an RFID tag ID unit of IDs of RFID tags 241 to 243 within the detection area of the tag reader 211 (S21) and transmits the RFID tag ID unit to the article management apparatus 230 (S22).

In the article management apparatus 230, the RFID tag receiver 231 acquires the RFID tag ID unit and outputs it to the RFID tag storage 232. Subsequently, the RFID tag storage 232 stores the acquired RFID tag ID unit with a time of the acquisition thereof into the storage DB 233 (S23).

Let us suppose that the owner of the articles then moves to bring the RFID tags 241–243 out of the detection area of the tag reader 211 and bring the RFID tags 241, 243 into the detection area of the tag reader 212 (the article with the RFID tag 242 is lost on the way of the movement). Through the steps of S21–S23 just as in the case of the tag reader 211, an RFID tag ID unit of IDs of the RFID tags detected by the tag reader 212 is stored into the storage DB 233. As a result, the data configuration in the storage DB 33 goes into a state shown in FIG. 16.

When the tag ID unit acquired by the tag reader 212 is stored into the storage DB 233, the RFID tag comparator 234 refers to the tag DB 221 to specify the owner of the articles corresponding to the ID unit. The RFID tag comparator 234 refers to the storage DB 233 and the tag DB 221 to determine whether an ID unit whose owner is the same as the specified owner and which was acquired before the acquisition of the tag ID unit acquired by the tag reader 212 exists in the ID units stored in the storage DB 233. When it is determined that such an ID unit exists (when a comparison object is specified), the existing ID unit is compared with the tag ID unit acquired by the tag reader 212 (S24). Subsequently, based on the result of the comparison, the RFID tag comparator 234 specifies an RFID tag ID corresponding to a difference between those RFID tag units. At the same time, it also determines whether the RFID tag ID is a decrease or an increase (S25). The result of the determination is reflected in the aforementioned increase/decrease flag.

In the present embodiment the RFID tag ID unit acquired by the tag reader 211 consists of 241, 242, and 243, whereas the RFID tag ID unit acquired by the tag reader 212 consists of 241 and 243, indicating a decrease of the RFID tag ID 242. Therefore, the RFID tag comparator 234 outputs the specified RFID tag ID with the increase/decrease flag "0" indicating the decrease, to the information provider 235.

Subsequently, based on the information supplied from the RFID tag comparator 234, the information provider 235 notifies the owner of a message of a lost article, and the lost article (a name of the article registered as an attached object) (S26). The information provider 235 acquires the name of the article and the owner to be notified, by referring to the tag DB 221, using the specified RFID tag ID 242 as a key. As shown in FIG. 17, the name of the article corresponding to the RFID tag ID 242 is a wallet and the owner thereof is Tom. Therefore, for example, a message of "You seem to have dropped a wallet" is sent to Tom. This notification can be made through a cell phone (tag ID 243) owned by the owner, detected simultaneously with the wallet, or, in view of cases where the owner drops or leaves the mobile equipment itself, the notification may be made by use of an information providing means such as a screen installed in the vicinity of the tag reader 212.

This permits the owner of the lost article to instantly notice the drop of the wallet during the movement between the tag reader 211 and the tag reader 212, from the contents of the notification.

The mobile equipment is, for example, a cell phone or a PDA, but, without having to be limited to these, it may also be an information equipment such as a personal computer with a communication function.

Next, an advertisement notification service associated with an acquired article will be described. If at S26 the storage DB 233 goes into a state shown in FIG. 19, a process described below will be carried out. In the same figure, the RFID tag ID unit acquired by the tag reader 211 consists of 241, 242, and 243, whereas the RFID tag ID unit acquired by the tag reader 212 consists of 241, 242, 243, and 244, indicating an increase of the RFID tag ID 244. Therefore, the RFID tag comparator 234 outputs the specified RFID tag ID with the increase/decrease flag "1" indicating the increase, to the information provider 235.

The information provider 235 detects the increase of the article from the information supplied from the RFID tag comparator 234, acquires a name of the article as the increase from the tag DB 221, and notifies an external information providing server apparatus (not shown) of the name. When the article with the RFID tag assigned to the RFID tag ID 244 is a bag, the name of the bag is notified of.

Receiving this notification, the server apparatus sends advertisement information about clothes and fancy goods looking good with the bag, via the tag reader 212 to Tom being the owner of the bag. This notification process can also be performed by use of the mobile equipment carried by the owner, the information presenting means installed in the vicinity of the tag reader 212, or the like. This permits an information providing party to provide timely information of high interest for the purchaser of the article.

According to the present invention, articles are managed based on change of RFID tag IDs acquired by the tag readers 211, 212, whereby it becomes feasible for the user to readily and accurately grasp the information about belongings with RFID tags (the message of the drop of belongings, the advertisement about the article newly purchased or the like, etc.) in real time.

The present embodiment was arranged to refer to the tag DB 221 storing tag IDs and owners in association with each other, in order to specify a tag ID unit acquired before the acquisition, which is a comparison object in the comparison between the tag ID units acquired by the tag readers 211, 212, but the specification of the ID unit may also be made by the following method.

Figure 20:
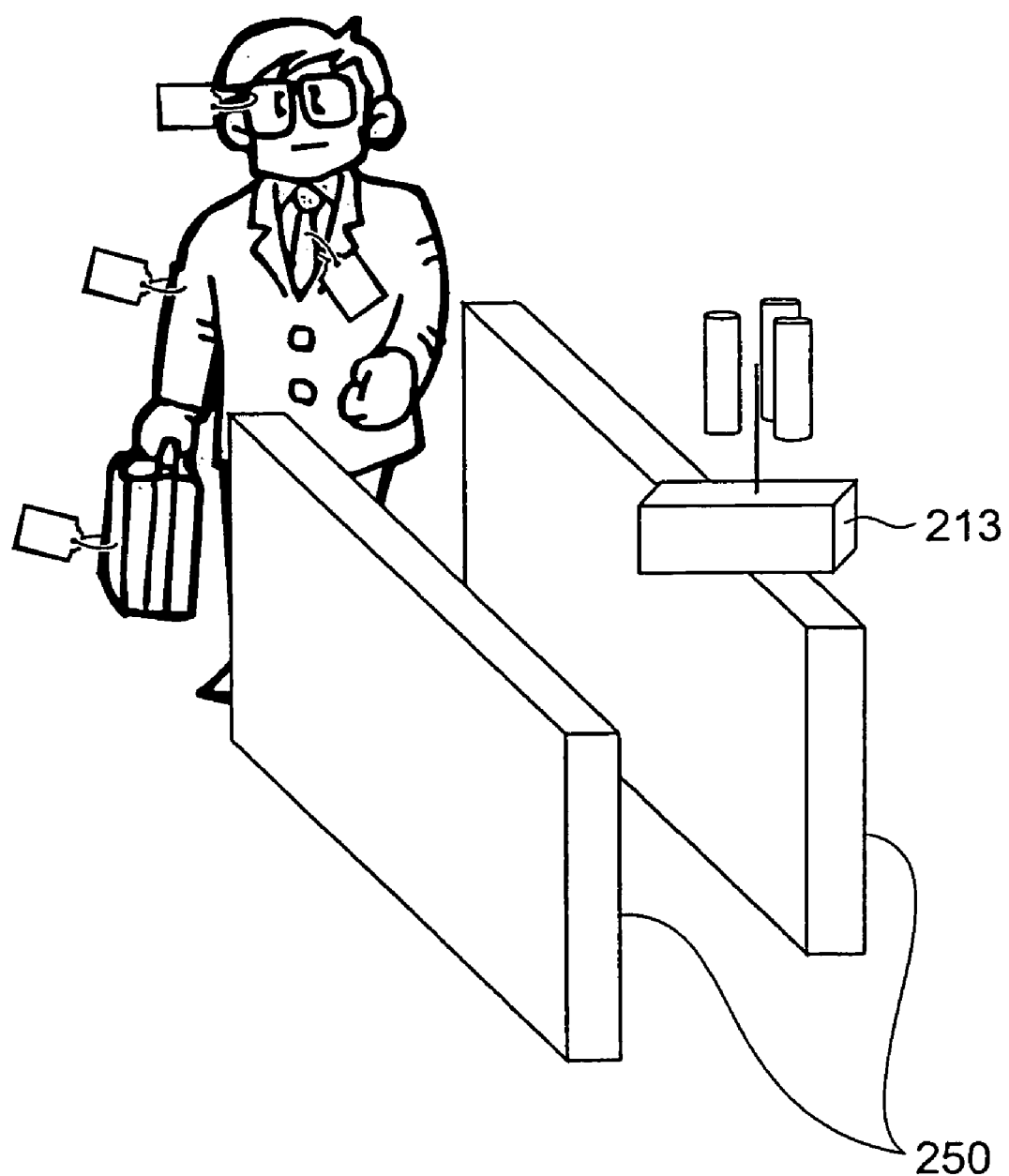
FIG. 20 is an illustration showing an installation example of a tag reader in the second embodiment.

As shown in FIG. 20, a gate 250 is installed in a size just enough to permit one person to pass like a ticket gate at a station, and a tag reader 213 is installed at the gate 250. This configuration prevents the tag reader from simultaneously detecting RFID tags of multiple people, and it can be assumed that a group of all RFID tags simultaneously detected are tags attached to articles of an identical owner. Furthermore, if an RFID tag ID unit at a certain time contains more than a given number of identical IDs to those in an RFID tag ID unit acquired at a different time, it can be determined that they are RFID tag IDs corresponding to articles owned by the same owner, and the RFID tag ID unit as a comparison object can be specified. The above gate 250 does not always have to be dedicated to the acquisition of RFID tag IDs, and, for example, use may be made of an automatic ticket gate at a station.

As shown in FIG. 21, the tag DB 221 may also be configured to store information for discriminating whether an RFID tag is attached to an article or to a person, for each RFID tag ID, and to permit this information to be used to specify the RFID tag ID unit as a comparison object. In this case, it can be assumed that an owner of articles corresponding to IDs of RFID tags detected by the tag readers 211, 212 is a man corresponding to an ID of an RFID tag attached to a person simultaneously acquired. The above permits the comparator to specify an RFID tag ID unit corresponding to articles of the same owner acquired at a different time, as a comparison object.

The above embodiment was configured to specify the comparison object of the RFID tag ID unit, in view of passage of time, in such a way that the storage DB was simply referred to and that an RFID tag ID unit already acquired before the acquisition was selected as a comparison object. However, it is also possible to adopt such a configuration that a more detailed condition may be added so as to select an RFID tag ID unit at the latest time among those previously acquired before the acquisition, or such a configuration that only an up-to-date ID unit is left for each owner. The above-described embodiments all were described in the presence of multiple tag readers, but it is also possible to adopt an embodied form using only a single tag reader.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An article management apparatus comprising:
acquiring means for acquiring an RFID tag ID unit and for storing the RFID tag ID unit in association with an entity;
specifying means for comparing the RFID tag ID unit acquired by the acquiring means, with an RFID tag ID unit acquired at a different time from the acquiring time of the former RFID tag ID unit, and for specifying an RFID tag ID corresponding to a difference obtained by the comparison so as to identify whether the difference exists and if there has been a change in association with the entity; and
transmitting means for transmitting information according to the RFID tag ID specified by the specifying means.

2. An article management apparatus comprising:
acquiring means for acquiring an RFID tag ID unit;
specifying means for comparing the RFID tag ID unit acquired by the acquiring means, with an RFID tag ID unit acquired at different time from the acquiring time of the former RFID tag ID unit, and for specifying an RFID tag ID corresponding to a difference obtained by the comparison;
transmitting means for transmitting information according to the RFID tag ID specified by the specifying means; and
wherein the acquiring means acquires an RFID tag ID unit comprising an ID of an RFID tag attached to an article and enabling identification of an owner of the article;
further comprising storing means for storing the RFID tag ID unit acquired by the acquiring means; and
wherein the specifying means compares the RFID tag ID unit corresponding to the owner, acquired by the acquiring means, with an RFID tag ID unit corresponding to the owner of an article corresponding to an RFID tag ID, acquired by the acquiring means, among RFID tag ID units stored by the storing means prior to the acquisition by the acquiring means, and specifies an RFID tag ID corresponding to a difference obtained by the comparison.

3. An article management apparatus comprising:
acquiring means for acquiring an RFID tag ID unit;
specifying means for comparing the RFID tag ID unit acquired by the acquiring means, with an RFID tag ID unit acquired at different time from the acquiring time of the former RFID tag ID unit, and for specifying an RFID tag ID corresponding to a difference obtained by the comparison;
transmitting means for transmitting information according to the RFID tag ID specified by the specifying means; and
an RFID tag ID database for storing an ID of an RFID tag and an owner of an article to which the RFID tag is attached, in correspondence with each other;
storing means for storing the RFID tag ID unit acquired by the acquiring means; and
wherein the specifying means refers to the RFID tag ID database to specify an owner of an article corresponding to an RFID tag ID acquired by the acquiring means, compares the RFID tag ID unit corresponding to the specified owner, acquired by the acquiring means, with an RFID tag ID unit corresponding to the owner among RFID tag ID units stored by the storing means prior to the acquisition by the acquiring means, and specifies an RFID tag ID corresponding to a difference obtained by the comparison.

4. An article management apparatus comprising:
acquiring means for acquiring an RFID tag ID unit;
specifying means for comparing the RFID tag ID unit acquired by the acquiring means, with an RFID tag ID unit acquired at different time from the acquiring time of the former RFID tag ID unit, and for specifying an RFID tag ID corresponding to a difference obtained by the comparison;
transmitting means for transmitting information according to the RFID tag ID specified by the specifying means;
an RFID tag ID database for storing discrimination information for discrimination between a person with an RFID tag and an article with an RFID tag, in correspondence with an ID of each RFID tag;
storing means for storing the RFID tag ID unit acquired by the acquiring means; and
wherein the specifying means refers to the RFID tag ID database to specify an ID of an RFID tag attached to a person, out of the RFID tag ID unit acquired by the acquiring means, compares the RFID tag ID unit acquired by the acquiring means, with an RFID tag ID unit acquired simultaneously with the ID of the RFID tag attached to the person, among RFID tag ID units stored by the storing means prior to the acquisition by the acquiring means, and specifies an RFID tag ID corresponding to a difference obtained by the comparison.

5. An article management apparatus comprising:
acquiring means for acquiring an RFID tag ID unit;
specifying means for comparing the RFID tag ID unit acquired by the acquiring means, with an RFID tag ID unit acquired at different time from the acquiring time of the former RFID tag ID unit, and for specifying an RFID tag ID corresponding to a difference obtained by the comparison; and
transmitting means for transmitting information according to the RFID tag ID specified by the specifying means;
storing means for storing the RFID tag ID unit acquired by the acquiring means;
comparing means for comparing the RFID tag ID unit acquired by the acquiring means, with an RFID tag ID unit stored by the storing means prior to the acquisition by the acquiring means; and wherein the specifying means, when a result of the comparison by the comparing means is that the two RFID tag ID units have identical IDs over a given number, compares the RFID tag ID unit acquired by the acquiring means, with the RFID tag ID unit stored by the storing means, to specify an RFID tag ID corresponding to a difference obtained by the comparison.

6. An information processing method in an article management apparatus comprising:

an acquiring step of acquiring an RFID tag ID unit and for storing the RFID tag ID unit in association with an entity;

an specifying step of comparing the RFID tag ID unit acquired in the acquiring step, with an RFID tag ID unit acquired at different time from the acquiring time of the former RFID tag ID unit, and specifying an RFID tag ID corresponding to a difference obtained by the comparison so as to identify whether the difference exists and if there has been a change in association with the entity; and transmitting step of transmitting information according to the RFID tag ID specified in the specifying step.

7. An information processing method in an article management apparatus comprising:

an acquiring step of acquiring an RFID tag ID unit;

an specifying step of comparing the RFID tag ID unit acquired in the acquiring step, with an RFID tag ID unit acquired at different time from the acquiring time of the former RFID tag ID unit, and specifying an RFID tag ID corresponding to a difference obtained by the comparison; and transmitting step of transmitting information according to the RFID tag ID specified in the specifying step;

wherein the acquiring step acquires an RFID tag ID unit comprising an ID of an RFID tag attached to an article and enabling identification of an owner of the article;

further comprising a storing step of storing the RFID tag ID unit acquired in the acquiring step; and wherein the specifying step compares the RFID tag ID unit corresponding to the owner, acquired in the acquiring step, with an RFID tag ID unit corresponding to the owner of an article corresponding to an RFID tag ID acquired in the acquiring step, among RFID tag ID units stored in the storing step prior to the acquisition in the acquiring step, and specifies an RFID tag ID corresponding to a difference obtained by the comparison.

8. An information processing method in an article management apparatus comprising:

an acquiring step of acquiring an RFID tag ID unit;

an specifying step of comparing the RFID tag ID unit acquired in the acquiring step, with an RFID tag ID unit acquired at different time from the acquiring time of the former RFID tag ID unit, and specifying an RFID tag ID corresponding to a difference obtained by the comparison;

transmitting step of transmitting information according to the RFID tag ID specified in the specifying step; and a storing step of storing the RFID tag ID unit acquired in the acquiring step; and wherein the specifying step refers to an RFID tag ID database storing an ID of an RFID tag and an owner of an article to which the RFID tag is attached, in correspondence with each other, to specify an owner of an article corresponding to an RFID tag ID acquired in the acquiring step, compares the RFID tag ID unit corresponding to the specified owner, acquired in the acquiring step, with an RFID tag ID unit corresponding to the owner among RFID tag ID units stored in the storing step prior to the acquisition in the acquiring step, and specifies an RFID tag ID corresponding to a difference obtained by the comparison.

9. An information processing method in an article management apparatus comprising:

an acquiring step of acquiring an RFID tag ID unit;

an specifying step of comparing the RFID tag ID unit acquired in the acquiring step, with an RFID tag ID unit acquired at different time from the acquiring time of the former RFID tag ID unit, and specifying an RFID tag ID corresponding to a difference obtained by the comparison;

transmitting step of transmitting information according to the RFID tag ID specified in the specifying step; and a storing step of storing the RFID tag ID unit acquired in the acquiring step; and wherein the specifying step refers to an RFID tag ID database storing discrimination information for discrimination between a person with an RFID tag and an article with an RFID tag, in correspondence with an ID of each RFID tag, to specify an ID of an RFID tag attached to a person, out of the RFID tag ID unit acquired in the acquiring step, compares the RFID tag ID unit acquired in the acquiring step, with an RFID tag ID unit acquired simultaneously with the ID of the RFID tag attached to the person, among RFID tag ID units stored in the storing step prior to the acquisition in the acquiring step, and specifies an RFID tag ID corresponding to a difference obtained by the comparison.

10. An information processing method in an article management apparatus comprising:

an acquiring step of acquiring an RFID tag ID unit;

an specifying step of comparing the RFID tag ID unit acquired in the acquiring step, with an RFID tag ID unit acquired at different time from the acquiring time of the former RFID tag ID unit, and specifying an RFID tag ID corresponding to a difference obtained by the comparison;

transmitting step of transmitting information according to the RFID tag ID specified in the specifying step;

a storing step of storing the RFID tag ID unit acquired in the acquiring step; and a comparing step of comparing the RFID tag ID unit acquired in the acquiring step, with an RFID tag ID unit stored in the storing step prior to the acquisition in the acquiring step, wherein the specifying step, when a result of the comparison in the comparing step is that the two RFID tag ID units have identical IDs over a given number, compares the RFID tag ID unit acquired in the acquiring step, with the RFID tag ID unit stored in the storing step, to specify an RFID tag ID corresponding to a difference obtained by the comparison.

11. An article management apparatus comprising:

acquiring means for acquiring an RFID tag ID unit;

specifying means for comparing the RFID tag ID unit acquired by the acquiring means, with an RFID tag ID unit acquired at different time from the acquiring time of the former RFID tag ID unit, and for specifying an RFID tag ID corresponding to a difference obtained by the comparison;

transmitting means for transmitting information according to the RFID tag ID specified by the specifying means; and storing means for storing an RFID tag ID unit comprising an ID of an RFID tag enabling identification of an owner, in advance;

wherein the acquiring means acquires an RFID tag ID unit comprising an ID of an RFID tag enabling identification of an owner; and the specifying means compares the RFID tag ID unit stored in the storing means, with an RFID tag ID unit having an identical identified owner to that of the stored RFID tag ID unit and acquired by the acquiring means, and specifies an RFID tag ID corresponding to a difference obtained by the comparison.

12. An information processing method in an article management apparatus comprising:

an acquiring step of acquiring an RFID tag ID unit;

an specifying step of comparing the RFID tag ID unit acquired in the acquiring step, with an RFID tag ID unit acquired at different time from the acquiring time of the former RFID tag ID unit, and specifying an RFID tag ID corresponding to a difference obtained by the comparison;

transmitting step of transmitting information according to the RFID tag ID specified in the specifying step; and a storing step of storing an RFID tag ID unit comprising an ID of an RFID tag enabling identification of an owner, in advance into storing means;

wherein the acquiring step acquires an RFID tag ID unit comprising an ID of an RFID tag enabling identification of an owner; and the specifying step compares the RFID tag ID unit stored in the storing means in the storing step, with an RFID tag ID unit having an identical identified owner to that of the stored RFID tag ID unit and acquired in the acquiring step, and specifies an RFID tag ID corresponding to a difference obtained by the comparison.

* * * * *